United States Patent [19]

Kubo et al.

[11] Patent Number: 4,726,254
[45] Date of Patent: Feb. 23, 1988

[54] FOUR WHEEL DRIVE POWER TRANSMISSION SYSTEM WITH FRONT UNIVERSAL JOINT OF FRONT PROPELLER SHAFT LOCATED TOWARDS GEARBOX FROM ENGINE

[75] Inventors: Seitoku Kubo; Yutaka Taga; Kunio Morisawa, all of Toyota, Japan

[73] Assignee: Toyota Jidosha Kabushiki Kaisha, Toyota, Japan

[21] Appl. No.: 903,239

[22] Filed: Sep. 3, 1986

[30] Foreign Application Priority Data

Sep. 4, 1985 [JP] Japan ................................ 60-195281

[51] Int. Cl.$^4$ ........................ F16H 37/06; F16H 57/02
[52] U.S. Cl. .................................... 74/665 T; 74/710; 74/606 R; 180/248
[58] Field of Search .................... 74/710, 740, 665 T, 74/606 R; 180/248, 249, 250

[56] References Cited

U.S. PATENT DOCUMENTS

| | | | |
|---|---|---|---|
| 1,353,411 | 9/1920 | Mieske | 180/248 X |
| 2,589,844 | 3/1952 | Moore | 180/248 X |
| 3,703,107 | 11/1972 | Piret | 74/606 R X |
| 3,941,199 | 3/1976 | Williams | 180/249 |
| 4,046,030 | 9/1977 | Suzuki | 74/710 |
| 4,289,213 | 9/1981 | Seaman | 180/248 X |
| 4,538,700 | 9/1985 | Suzuki | 180/248 |

FOREIGN PATENT DOCUMENTS

| | | | |
|---|---|---|---|
| 268705 | 2/1964 | Australia | 180/248 |
| 172992 | 11/1952 | Fed. Rep. of Germany | 74/710 |
| 309838 | 6/1930 | United Kingdom | 74/710 |

*Primary Examiner*—Dirk Wright
*Attorney, Agent, or Firm*—Oblon, Fisher, Spivak, McClelland & Maier

[57] ABSTRACT

In an assembly for a vehicle of an engine and a four wheel drive power transmission system including a speed change device, a first power distribution device for distributionally dividing rotational power toward a pair of front wheels and a pair of rear wheels and a second power distribution device for rotationally dividing rotational power for the pair of either the front wheels or the rear wheels, wherein the engine, the speed change device and the first power distribution device are assembled in this order along a common central axis with one of two output shafts of the first power distribution device being shifted sideward of the central axis and directed toward the engine while the second power distribution device is mounted to a side of the engine with an input shaft thereof being directed toward and substantially aligned with the above-mentioned output shaft of the first power distribution device, a propeller shaft to connect the above-mentioned output shaft of the first power distribution device by a splined sleeve engagement, an intermediate portion of the output member of the second universal joint being rotatably supported by a radial bearing mounted to the speed change device, so that the speed change device, the first power distribution device, the first universal joint, the propeller shaft and the second universal joint may be preassembled together, and this preassembly may be axially abutted to the engine with the second power distribution device preassembled thereto.

4 Claims, 6 Drawing Figures

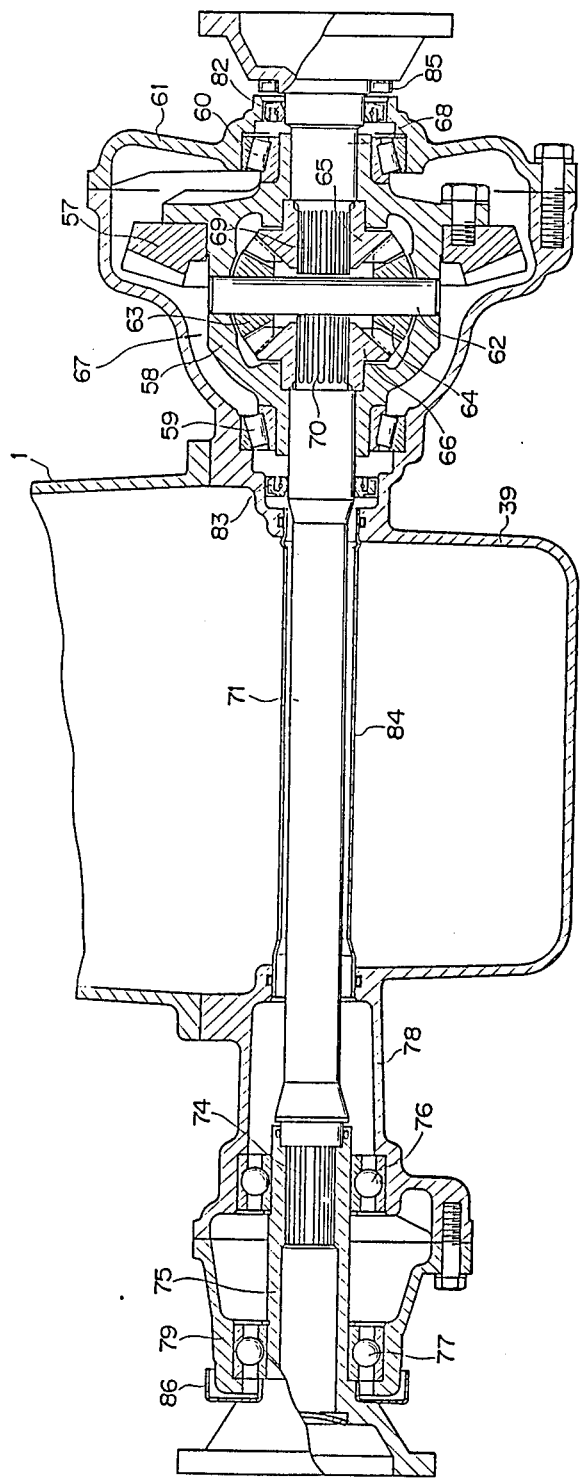

FOUR WHEEL DRIVE POWER TRANSMISSION SYSTEM WITH FRONT UNIVERSAL JOINT OF FRONT PROPELLER SHAFT LOCATED TOWARDS GEARBOX FROM ENGINE

BACKGROUND OF THE INVENTION

The present invention relates to a four wheel drive power transmission system, and more particularly relates to such a four wheel drive power transmission system for a vehicle such as an automobile adapted for four wheel drive operation, in which the construction is improved so as to minimize the universal joint angle for a front propeller shaft incorporated therein, thereby to minimize noise and vibration and maximize transmission working life.

The present invention has been described in Japanese patent application Ser. No. 60-195281 (1985), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attract the attention of the examining authorities to their copending patent applications Ser. Nos. 903,243 and 903,241, which may be considered to be material to the examination of the present patent application, and which are coowned with or are subject to obligations of coassignment together with the present patent application.

In Japanese Utility Model Application Laying Open Publication Ser. No. 47-203 (1972), as well as in the publication Ser. No. 710615 of the Society of Automotive Engineers (SAE), neither of which is it intended hereby to admit as prior art to the present patent application except to the extent in any case required by applicable law, there is disclosed a four wheel drive power transmission system, comprising, connected in order to a power unit such as for example a front mounted longitudinally disposed internal combustion engine in the specified order, a speed change device (i.e., a gearbox or automatic transmission or the like) and a power distribution device for four wheel drive operation (a so called transfer device) having a front wheel drive output shaft and a rear wheel drive output shaft, with one end each of a front propeller shaft and a rear propeller shaft being connected respectively to said front wheel drive output shaft and to said rear wheel drive output shaft, and with the other ends of said front propeller shaft and said rear propeller shaft being respectively connected to respective input shafts of power distribution devices such as speed reducing differential devices for respectively the front wheels of the vehicle and the rear wheels of the vehicle; with, particularly, the power distribution device for the front wheels of the vehicle being attached and mounted to an oil pan of the internal combustion engine; and, further, with a universal joint being provided between the input shaft of said power distribution device for the front wheels and the end of the front propeller shaft drivingly connected thereto.

In a thus constructed four wheel drive power transmission system, the front propeller shaft is disposed on and passes along one side of the series coupled combination of the internal combustion engine, the speed change device, and the power distribution device for four wheel drive operation, and along the same direction along which said three units are coupled in series; and, as mentioned above, conventionally the front end of said front propeller shaft is connected to the end of said input shaft of said power distribution device for the front wheels (hereinafter referred to as the front differential device) by means of a universal joint. However, the problem arises that such a universal joint tends to fall, in its longitudinal positioning, just by the joining portion between the internal combustion engine and the speed change device, which typically is the portion of the combination of the aforementioned three units coupled in series which projects most to the side, especially in the case that the speed change device is an automatic transmission in which case said automatic transmission typically includes a torque converter which is very fat and bulky and causes a bulge in the housing receiving it. In order to avoid interference between the universal joint and the joining portion between the internal combustion engine and the speed change device, the installation position of said universal joint must be considerably spaced apart from said joining portion, i.e. a substantial distance from the conjoined combination of the internal combustion engine and the speed change device, and this not only increases the space taken up by the four wheel drive power transmission system, but also creates the requirement that the central axial line of the front propeller shaft must be angled at a considerable angle from the longitudinal axis of the conjoined combination of the internal combustion engine and the speed change device, which means that the joint angle of the aforementioned universal joint is increased. This can lead to problems with noise and vibration during four wheel drive operation and during rotation of the front propeller shaft, as well as to shortened service life and unsatisfactory reliability. Further, disadvantages arise from the point of view of mass production, because of the requirement for the front propeller shaft, the universal joint, and the front differential device to be each manufactured and fitted in place with a high degree of accuracy, in order to avoid the danger of the occurrence of incorrect assembly.

SUMMARY OF THE INVENTION

The inventors of the present invention have considered the various problems detailed above in the aforementioned type of construction, from the point of view of the desirability of minimizing the joint angle of the universal joint joining the front propeller shaft and the power input member of the front differential device.

Accordingly, it is the primary object of the present invention to provide an improved four wheel drive power transmission system of the general type described above, which avoids the problems detailed above.

It is a further object of the present invention to provide such a four wheel drive power transmission system, which reduces the required joint angle for the universal joint joining the front propeller shaft and the power input member of the front differential device.

It is a yet further object of the present invention to provide such a four wheel drive power transmission system, which minimizes noise and vibration.

It is a yet further object of the present invention to provide such a four wheel drive power transmission system, which maximizes service life and reliability.

It is a yet further object of the present invention to provide such a four wheel drive power transmission system, which maximizes good mountability in the vehicle.

It is a yet further object of the present invention to provide such a four wheel drive power transmission system, which is easy to assemble and economical to manufacture.

According to the most general aspect of the present invention, these and other objects are attained by a four wheel drive power transmission system for a vehicle with an engine, comprising: (a) a speed change device, affixed against an end of said engine at a connection portion therebetween, and coupled to said engine so as to receive rotational power therefrom; (b) a power distribution device for four wheel drive, affixed against an end remote from said engine of said speed change device, coupled to said speed change device so as to receive rotational power from said speed change device, and provided with two rotational power output shafts between which it distributes said rotational power; (c) a first propeller shaft coupled to one of said rotational power output shafts of said power distribution device for four wheel drive, and leading to conduct rotational power to a pair of wheels of said vehicle which are remoter from said engine; (d) a second propeller shaft a one end of which is rotationally coupled to the other of said rotational power output shafts of said power distribution device for four wheel drive; (e) a power distribution device for a pair of wheels of said vehicle closer to said engine, mounted to said engine, and comprising a power input shaft aligned so that its outer end generally points towards said power distribution device for four wheel drive; and: (f) a universal joint rotationally coupled on its one side to the other end of said second propeller shaft and rotationally coupled on its other side to said power input shaft of said power distribution device; said second propeller shaft running generally along and beside the combination of said engine, said speed change device, and said power distribution device for four wheel drive, with said universal joint being located, in the axial direction of said combination, on the side of the connection portion between said engine and said speed change device towards said speed change device.

According to such a four wheel drive power transmission system as specified above, since the axial position of the universal joint which rotationally couples said other end of said second propeller shaft to said power input shaft of said power distribution device is arranged to be displaced towards said speed change device from the connection portion between said engine and said speed change device, thereby said connection portion, which is typically the fattest or most grossly transversely extending portion of said engine and speed change device combination, is avoided; and thus, as compared with the case in which said universal joint is axially positioned next to said connection portion, or forward of said connection portion on the side thereof towards said engine, the overall run of said second propeller shaft can be made to be closer to said engine and speed change device combination. Thereby, the joint angle of said universal joint, as well as that of another universal joint which desirably is provided between the said one end of said second propeller shaft and said other of said rotational power output shafts of said power distribution device for four wheel drive, is reduced to a low angle such as for example from 0° to 2°, and thereby noise and vibration are minimized, and further fitting space is economized upon, thus maximizing vehicle mountability.

Further, according to another particular specialization of the present invention, the above specified and other objects are more particularly attained by a four wheel drive power transmission system as specified above, wherein the coupling between said other side of said universal joint and said power input shaft of said power distribution device fixes said two members to one another with regard to relative movement in the rotational sense while allowing axial movement between them. This allows for dimensional errors in the axial direction of the drive construction elements such as the first propeller shaft, the universal joint, and the power distribution device to be compensated for by this certain degree of axial play, and therefore such dimensional errors do not lead to problems in fitting and adjusting the transmission system appropriately.

Yet further, according to another particular specialization of the present invention, the above specified and other objects are more particularly attained by a four wheel drive power transmission system as specified above, further comprising a means for rotatably supporting from said speed change device an outer portion of said power input shaft of said power distribution device. This will make the support of said power input shaft, and of said second propeller shaft, more sure and certain, thus enhancing transmission system life.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

FIG. 6 is a lateral sectional view taken through an oil pan of the vehicle engine and through said front differential device, for showing the construction by which rotational power is transmitted through said oil pan to the front wheel on the other side of the engine from said front differential device.

DESCRIPTION OF THE PREFERRED EMBODIMENT

Figure 1:
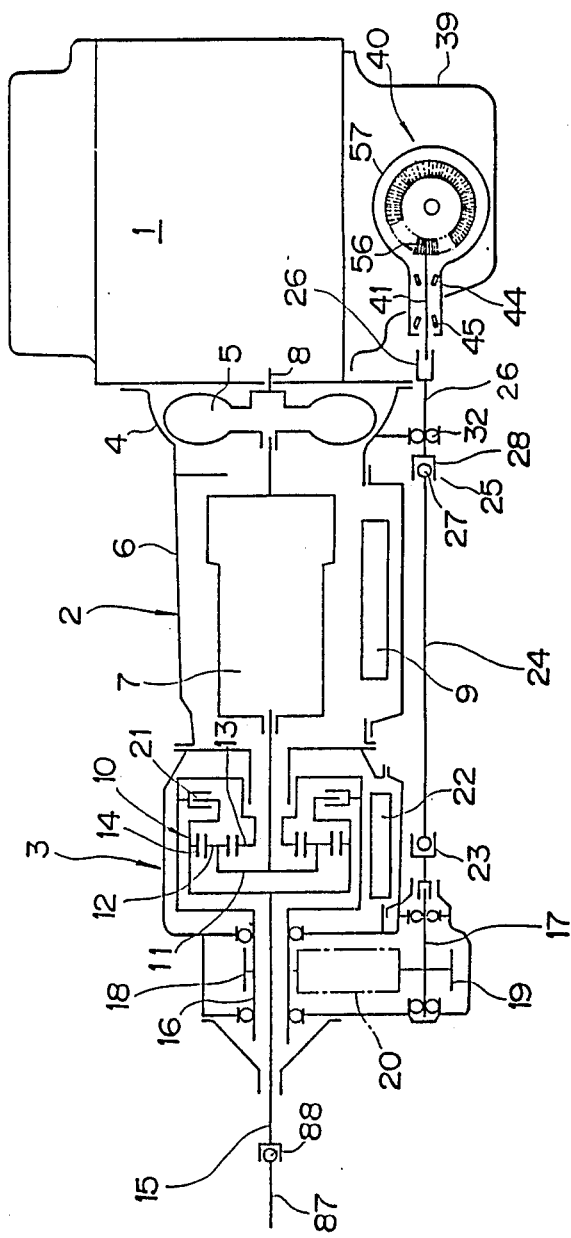
FIG. 1 is a longitudinal skeleton view of a vehicle power train which incorporates the preferred embodiment of the four wheel drive power transmission system of the present invention.

The present invention will now be described with reference to the preferred embodiment thereof, and with reference to the figures. FIG. 1 is a longitudinal skeleton view of a vehicle power train which incorporates the preferred embodiment of the four wheel drive power transmission system of the present invention. In this figure, the reference numeral 1 denotes an internal combustion engine of said vehicle, which is mounted, in this exemplary case, longitudinally in the front engine room (not particularly shown) of said vehicle. And the reference numeral 2 denotes an automatic speed change device (automatic transmission) of a per se known type, while 3 denotes a first or four wheel drive power transfer device.

In more detail, the automatic speed change device 2 incorporates a fluid torque converter 5 of a per se known construction, and the power input shaft (not particularly shown) of this fluid torque converter 5 is connected to and receives rotational power from a crank shaft (not shown either of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing 6 fitted against and secured to the torque converter housing 4. And the input shaft (not particularly shown) of the gear transmission mechanism 7 is connected to and receives rotational power from the power output shaft (not shown either) of the fluid torque converter 5; and thereby the gear transmission mechanism 7 receives rotational power from the internal combustion engine 1, with a certain degree of slippage and also torque amplification being provided for said rotational power by the fluid torque converter 5 as is per se conventional. This gear transmission mechanism 7 may for the purposes of this specification be of a per se known type incorporating various planetary gear mechanisms and friction engaging mechanisms such as clutches and brakes, and according to selective actuation of said friction engaging mechanisms provided by a hydraulic control mechanism 9 of a per se known sort provides any one of a plurality of speed reduction stages between its said power input shaft and its said power output shaft.

The four wheel drive power transfer device 3 incorporates a central differential device 10 of a planetary gear wheel type for providing differential action between the front wheels of the vehicle and the rear wheels of the vehicle during the full time four wheel drive operation for which this four wheel drive power transmission system is adapted. Now the detailed construction of this central differential device 10 will be explained. It comprises a sun gear 13, a ring gear 14, a carrier 11, and a plurality of planetary pinions 12 rotatably mounted to said carrier 11 and meshed between the sun gear 13 and the ring gear 14 and performing planetary movement between them in a per se known manner. The carrier 11 functions as an input member for this central differential device 10, and is rotationally connected to the output shaft of the gear transmission mechanism 7 via a shaft which passes through the central axis of the hollow sun gear 13. The ring gear 14 functions as one power output member for the central differential device 10 for supplying power to the rear wheels of the vehicle, and is rotationally connected to a first or rear wheel rotational power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the central differential device 10 for supplying power to the front wheels of the vehicle, and is rotationally connected to a sleeve shaped intermediate front wheel drive shaft 16 via a drum member fitted around the planetary gear mechanism as a whole. This intermediate front wheel drive shaft 16 is hollow and is fitted around the portion of the rear wheel power output shaft 15 within the housing of this four wheel drive power transfer device 3, and on its outside there is fixedly mounted a sprocket wheel rotational power 18. An endless chain 20 is fitted around this sprocket wheel 18 and another sprocket wheel 19 provided below (and to one side of) said sprocket wheel 18 (from the point of view of the figure and in the actual vehicle body also) and with its central axis parallel to the central axis of said sprocket wheel 18. The sprocket wheel 19 is fixedly mounted on a front wheel power output shaft 17, one end of which protrudes from the housing of this four wheel drive power transfer device 3 in the leftwards direction in the figure, i.e. towards the front end of the vehicle in this particular exemplary implementation.

Further, within the four wheel drive power transfer device 3 there is provided a hydraulically operated wet type clutch 21, which selectively either rotationally connects together the sun gear 13 and the ring gear 14, or alternatively allows said members to rotate freely with respect to one another. This wet clutch 21 is selectively operated by a hydraulic control device 22. Accordingly, the four wheel drive power transfer device 3, which receives rotational power input from the gear transmission mechanism 7 and outputs said rotational power to the rear wheel power output shaft 15 and the front wheel power output shaft 17, can be caused either to provide differential action for distributing said rotational power between said rear wheel power output shaft 15 and said front wheel power output shaft 7, or not to provide any such differential action and just to drive said shafts 15 and 17 independently.

Via a universal joint 18 of a per se known sort, the rear end of the rear wheel power output shaft 15 rotationally drives the front end of a rear wheel propeller shaft 87.

Figure 3:
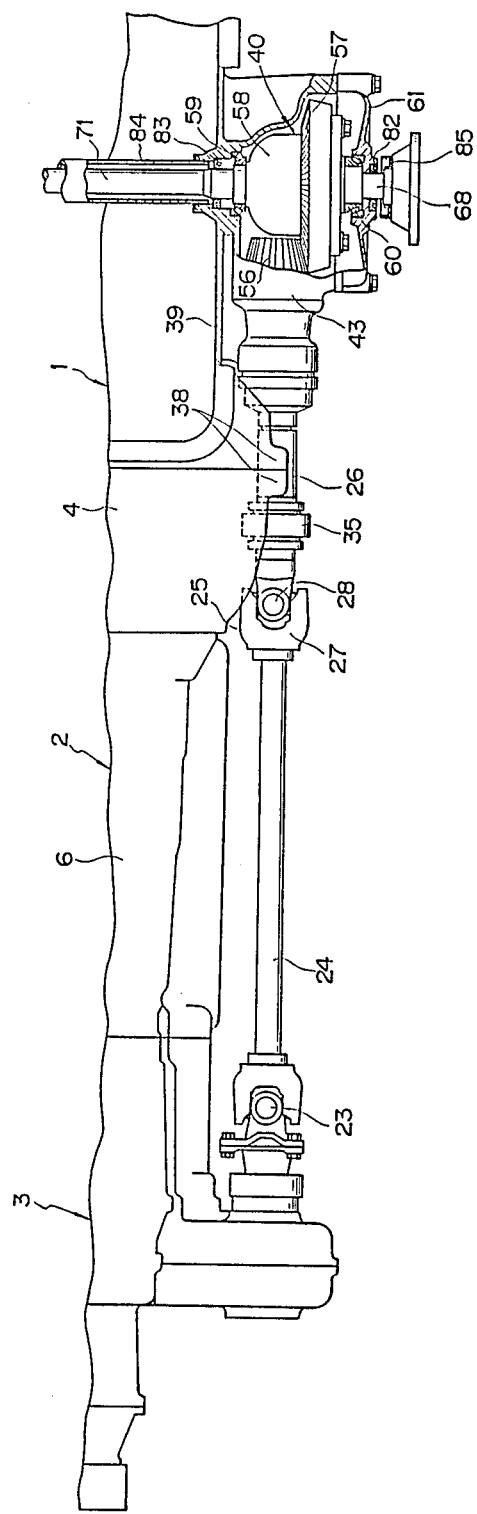
FIG. 3 is a partly sectional plan view of a front propeller shaft, a sleeve shaft coupled thereto, and a front differential device coupled to the sleeve shaft, included in said vehicle power train.

And, via a universal joint 23 also of a per se known sort, the front end of the rear wheel power output shaft 15 rotationally drives the rear end of a first second or front wheel propeller shaft 24. Thus, the front wheel propeller shaft 24 extends alongside and generally below the automatic speed change device 2 including the fluid torque converter 5 therein, roughly parallel to the longitudinal axis thereof. The front end of this front wheel propeller shaft 24 is rotationally connected, via another or second universal joint 25 also of a per se known sort, to the rear end of a sleeve shaft or rotational power input members 26; reference should now be made to FIGS. 3 and 4 which show this portion of the construction in a more detailed plan view. In more detail, this universal joint 25 comprises a first yoke 27 integrally fixed to the rear end of the front wheel propeller shaft 24, a cross member not particularly shown, and a second yoke 28 fitted on the rear end of a yoke shaft 29 via splines 30 and fixed thereto by a nut 31. The yoke shaft 29 is inserted into one end of the sleeve shaft 26 and is integrally attached thereto and made therewith.

Figure 4:
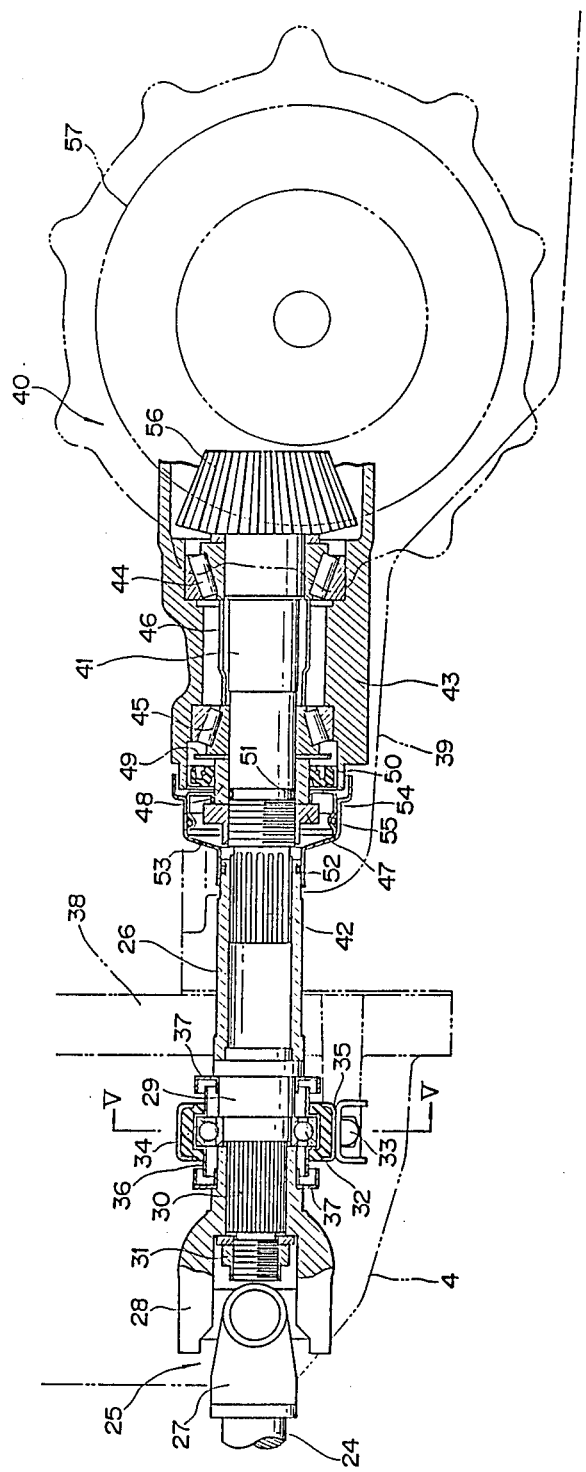
FIG. 4 is an enlarged side partly schematic view showing the end of said propeller shaft, said sleeve shaft, and a portion of said front differential device.
Figure 5:
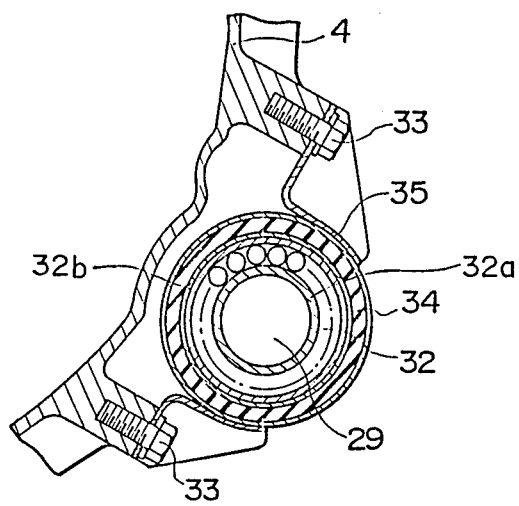
FIG. 5 is a sectional view of a ball bearing and its mounting arrangements, taken in a plane shown by the arrows V—V in FIG. 4.

Around the sleeve shaft 26 there is fitted the inner race 32a of a radial ball bearing 32. The outer race 32b of this radial ball bearing, as best shown in the sectional view of FIG. 5, is fitted into the inner cylindrical surface of a toroidal anti vibration cushion member 34, which may be made a synthetic rubber or some similar elastomer. The outer cylindrical surface of said anti vibration cushion member 34 is fitted into a bearing support bracket 35, which is secured by a plurality of bolts 33 to the side of the torque converter housing 4. Thereby, the sleeve shaft 26 is rotatably supported from said torque converter housing 4. As best seen in FIG. 4, around the periphery of the radial ball bearing 32 there is fitted a cylindrical dust cover 36, attached to the bearing bracket 35, and further there are provided two toroidal dust covers 37 fixed to the yoke shaft 29. These members in cooperation from an enclosing and shielding construction which prevents foreign bodies or contaminants such as road dirt or muddy water or the like from entering into the operational portions of the radial ball bearing 32.

Particularly according to the concept of the present invention, the axial position of installation of the universal joint 25, which couples the front end of the front wheel propeller shaft 24 to the power input member of the second or front differential device 40, is arranged to be on the side of the automatic speed change device 2 with respect to the joining portion between the body of said internal combustion engine 1 and the casing of said automatic speed change device 2; this joining portion is denoted in FIG. 4 by the reference numeral 38, and is only diagrammatically shown. Said joining portion 38 is typically the fattest portion of the engine/transmission combination, i.e. the portion thereof which extends transversely to the greatest extent. By this arrangement, the installation position in the transverse direction of this universal joint 25 can be brought sufficiently close to the central axis of said engine/transmission combination to ensure that the front wheel propeller shaft 24 can extend approximately parallel to said central axis and to the central longitudinal axis of the vehicle, which allows the joint angle of said universal joint 25 (and of the other universal joint 23 also) to be set to be very small, typically not more than about 2°. Thus, the portion of the front drive system, which is made up from and comprises the front propeller shaft 24, the universal joints 23 and 25, and the sleeve shaft 26, has a very slim portion thereof, to wit the sleeve shaft 26, adjacent to and beside said connection portion 38 between the body of the internal combustion engine 1 and the casing of the automatic speed change device 2.

The end of the sleeve shaft 26 remote from the universal joint 25 is engaged by means of a spline construction 42 with the outer end of a drive pinion shaft 41, which constitutes the power input shaft of the front differential device 40. This drive pinion shaft 41 is rotatably supported from a differential casing 43 of the front differential device 40, which is formed integrally with the oil pan 39 of the internal combustion engine 1, by means of two tapered roller bearings 44 and 45; and the drive pinion shaft 41 and the sleeve shaft 26, while they are rotationally coupled together by means of the splined construction 42, are able to move axially with respect to one another by the sliding action of said splined construction 42. The tapered roller bearings 44 and 45 are maintained at their appropriate spacing with regard to one another by the action of a distance collar 46 fitted over the drive pinion shaft 44 between them, and the thrust force from a nut 47 threaded on to the drive pinion shaft 41 is applied through a small diameter thrust collar 48 and a seat 49 fitted over the drive pinion shaft 41 so as to be able to be slid axially therealong, whereby a particular and desirable thrust preload is applied to said tapered roller bearings 44 and 45.

The thrust collar 48 is proximate to an open end of the tubular extending portion of the differential casing 43 which houses the drive pinion shaft 41, and an oil seal 50 is provided between said thrust collar 48 and said open end of said tubular extending portion of the differential casing 43. Also, an O-ring 51 is provided between the thrust collar 48 and the drive pinion shaft 41. Further, at the end of the sleeve shaft 26 remote from the universal joint 25 and proximate to the drive pinion shaft 41 there is fitted a stepped cylindrical dust cover 53, which is adapted to be slidable in the axial direction, and has interposed between it and the periphery of the end portion of the sleeve shaft 26 and O-ring 52. This dust cover 53 extends so as to surround the position of the nut 47 and so as to fit over the periphery of the aforesaid open end of the tubular extending portion of the differential casing 43. And, further, around the periphery of the thrust collar 48 there is fitted a cylindrical dust cover 54, and this dust cover 54 fits, with the interposition of an O-ringg 55 in between them, into the inner cylindrical surface of the dust cover 53, so as to be slidable with respect thereto in their axial direction. Thus, the dust covers 53 and 54 mutually cooperate so as to seal the region of the splined portion 42, and at the same time form an enclosing and shielding construction which prevents foreign bodies or contaminants such as road dirt or muddy water or the like from entering into the region in which the oil seal 50 is installed.

At the other end of the drive pinion shaft 41, which is supported from the housing of the differential device by the tapered roller bearing 44, i.e. at its inner end, there is provided a bevel gear drive pinion 56, and this bevel gear drive pinion 56 is on the side of the internal combustion engine 1 from a ring gear 57 of the frong differential device 40, and is constantly meshed with said ring gear 57. The ring gear 57 is fitted to a differential housing 48 and together with this differential housing 48 is rotatably supported from the oil pan 39 of the internal combustion engine 1 and from a differential casing cover 61 fitted to the differential casing 43 by means of tapered roller bearings 59 and 60.

Figure 2:
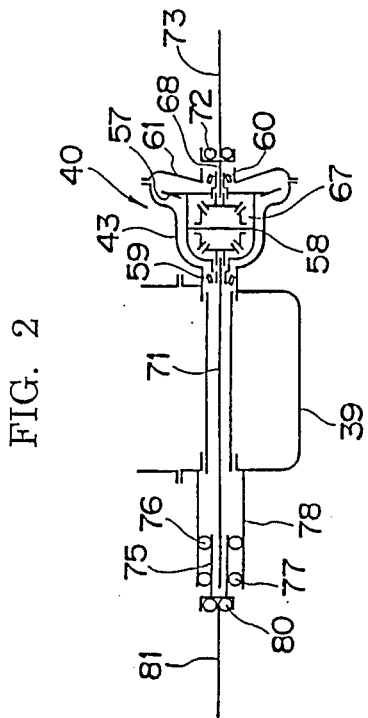
FIG. 2 is a skeleton diagram showing the front wheel drive portion of said vehicle power train, and particularly showing the arrangements for the rotational power for one of the front wheels of the vehicle to be passed through the engine oil pan.

Referreing particularly to the sectional view of FIG. 6 which shows the lower part of the internal combustion engine 1 with its oil pan 39 affixed thereto and with the front differential device 40 (vide FIG. 2), within the housing 58 of said front differential device 40 there is fitted a differential gear wheel mechanism 67, which comprises a differential pinion shaft 62 fitted in said differential housing 58, two differential pinions 63 and 64 rotatably fitted on and differential pinion shaft 62, and left and right side gear wheels 65 and 66 respectively, rotatably supported within the differential housing 58 and each of them meshing with both of said two differential pinions 63 and 64. The left side gear wheel 65 (from the point of view of the vehicle although it is on the right side in the figure) is coupled by means of a spline construction 69 to a left side power output shaft 68, while the right side gear wheel 66 is coupled by means of a spline construction 70 to a left side intermediate power output shaft 71. The left side power output shaft 68 projects rightward in the figure out from the housing 58 of the differential device to the outside, and at its end portion (see FIG. 2) it is coupled via a universal joint 72 to a left side drive shaft 73, which transfers rotational power to the left side front wheel of the vehicle possibly via another universal joint; said left side front wheel and so on are not shown in the figures. On the other hand, the right side intermediate power output shaft 71 passes right through the oil pan 39 as will be explained shortly, and projects out therefrom on the other side of said oil pan 39 from the front differential device 40, to be there coupled by means of a spline construction 74 to a right side power output sleeve shaft 75. This right side power output sleeve shaft 75 is rotatably supported by means of two radial ball bearings 76 and 77 in a bearing housing 78 which is formed as a projection from the oil pan 39 and in a bearing house cover 79 attached to this bearing housing 78. Said right side power output sleeve shaft 75 is then drivingly coupled at its outer end portion (see FIG. 2) via a universal joint 80 to a right side drive shaft 81, which transfers rotational power to the right side front wheel of the vehicle, possibly via another universal joint; said right side front wheel and so on are also not shown in the figures. The left side drive shaft 73 and the right side drive shaft 81 are of substantially the same length.

An oil seal 82 is fitted between the left side power output shaft 68 and the differential casing cover 61, and similarly an oil seal 83 is fitted between the right side intermediate power output shaft 71 and the differential casing 43. Thus, the differential casing 43 is sealed from the outside by the action of these oil seals 82 and 83. In the oil pan 39 there is provided a cover tube 84 spanning between its right and left sides, and the right side intermediate power output shaft 71 passes through this cover tube 84 and is thereby isolated from the interior of the oil pan 39.

A cylindrical dust cover 85 is fitted around the outer end of the left side drive shaft 73, so as to form an enclosing and shielding construction which prevents foreign bodies or contaminants such as road dirt or muddy water or the like from entering into the region in which the oil seal 82 is installed. Likewise, another cylindrical dust cover 86 is fitted around the outer end of the right side drive shaft 75, so as to form another enclosing and shielding construction which prevents foreign bodies or contaminants such as road dirt or muddy water or the like from entering into the region in which the radial ball bearing 77 is installed.

Thus, by means of the provision of the above explained construction in the above described configuration, the axial position of installation of the universal joint 25 which couples the front end of the front wheel propeller shaft 24 to the power input member of the front differential device 40, is arranged to be on the side of the automatic speed change device 2 from the joining portion 38 between the body of said internal combustion engine 1 and the casing of said automatic speed change device 2, which is typically the fattest portion of the engine/transmission combination, i.e. the portion thereof which extends transversely to the greatest extent. By this arrangement, the installation position in the transverse direction of this universal joint 25, which typically is the fattest portion of the front differential drive combination including the front wheel propeller shaft 24 and the sleeve shaft 26, can be brought sufficiently close to the central axis of said engine/transmission combination to ensure that the front wheel propeller shaft 24 can extend approximately parallel to said central axis and to the central longitudinal axis of the vehicle, so as to allow the joint angle of said universal joint 25 (and of the other universal joint 23 also) to be set to be not more than about 0° to 2°. Thereby, the generation of noise and vibration, due to the angling of this front wheel propeller shaft 24, are minimized; and, further, wear on the bearings of the universal joints 23 and 25 is minimized, thus ensuring a long service life for the front drive assembly including said universal joints 23 and 25 and said front wheel propeller shaft 24. Thus, the portion of the front drive system, which is made up from and comprises the front propeller shaft 24, the universal joints 23 and 25, and the sleeve shaft 26, is located so as to have a very slim portion thereof, to wit the sleeve shaft 26, adjacent to and beside said connection portion 38 between the body of the internal combustion engine 1 and the casing of the automatic speed change device 2. And, similarly, the support construction for said front drive system including the bearing 35, which inevitably is a fattened portion of said front drive system, is arranged to be axially located, not beside said connection portion 38 which would undesirably displace the front drive system to the side again, but beside a narrowed portion of the torque converter housing 4, so as not to cause any problem with regard to angling of the front wheel propeller shaft 24. Also, by the shown construction, the front differential device 40 can be positioned close to the side wall of the internal combustion engine 1 or of its oil pan 39, and the rigidity of support provided for this front drive system including the front differential device 40 can be maximized.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example, although in the shown preferred embodiment there was disclosed an application of the present invention to a four wheel drive vehicle configuration in which the engine was mounted in a front engine room, alternatively the present invention could be applied to a vehicle with the engine mounted in the rear thereof, i.e. to a rear engined vehicle. In this case, the roles of the front and the rear propeller shafts should be reversed. Other variations could be envisaged. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed:

1. A four wheel drive power transmission system for a vehicle with an engine, a pair of front wheels and a pair of rear wheel, comprising:
   a speed change device affixed to an axial end of said engine and operationally coupled to said engine so as to receive rotational power therefrom;
   a first power distribution device affixed to an axial end remote from said engine of said speed change device and operationally coupled to said speed change device so as to receive rotational power therefrom, said first power distribution device having first and second mutually sidewardly shifted and oppositely directed rotational power output shafts for distributionally supplying two rotational power outputs respectively either for said pair of front wheels or said pair of rear wheels or vice versa, said second output shaft being positioned sidewardly of a principal body of said first power distribution device and directed toward said engine;

a first propeller shaft coupled to said first rotational power output shaft of said first power distribution device for supplying rotational power to either said pair of front wheels or said pair of rear wheels which are remote from said engine;

a second power distribution device mounted to said engine and having a rotational power input shaft substantially aligned with said second rotational power output shaft of said first power distribution device for receiving a rotational power input therefrom and two rotational power output shafts for distributionally supplying two rotational power outputs for the pair of either said rear wheels or said front wheels which are closer to said engine;

a first universal joint having a rotational power input member firmly mounted to said second rotational power output shaft of said first power distribution device and a rotational power output member;

a second propeller shaft firmly connected at one end thereof with said rotational power output member of said first universal joint;

a second universal joint having a rotational power input member firmly connected with another end of said second propeller shaft and a rotational power output member rotationally coupled with said rotational power input shaft of said second power distribution device by a spline engagement; and a radial bearing mounted to said speed change device for rotatably supporting an axially intermediate portion of said rotational power output member of said second universal joint.

2. A four wheel drive power transmission system according to claim 1, wherein said second propeller shaft runs generally along and beside the combination of said engine, said speed change device and said first power distribution device.

3. A four wheel drive power transmission system according to claim 1, wherein said second propeller shaft is substantially parallel to a central longitudinal axis of the combination of said engine, said speed change device and said first power distribution device within an angle of relative inclination equal to or less than about 2°.

4. A four wheel drive power transmission system according to claim 1, wherein said spline engagement is an axial insertion of an externally splined end of said rotational power output member of said second universal joint into an internally splined sleeve end portion supported by said rotational power input shaft of said second power distribution device.

* * * * *